(12) United States Patent
Rasmussen et al.

(10) Patent No.: US 7,865,301 B2
(45) Date of Patent: *Jan. 4, 2011

(54) SECONDARY MAP IN DIGITAL MAPPING SYSTEM

(75) Inventors: Jens Eilstrup Rasmussen, San Francisco, CA (US); Bret Steven Taylor, Menlo Park, CA (US); Lars Eilstrup Rasmussen, Fairlight (AU)

(73) Assignee: Google Inc., Mountain View, CA (US)

( * ) Notice: Subject to any disclaimer, the term of this patent is extended or adjusted under 35 U.S.C. 154(b) by 1250 days.

This patent is subject to a terminal disclaimer.

(21) Appl. No.: 11/323,603

(22) Filed: Dec. 29, 2005

(65) Prior Publication Data

US 2006/0139375 A1 Jun. 29, 2006

Related U.S. Application Data

(63) Continuation-in-part of application No. 11/051,534, filed on Feb. 5, 2005, now Pat. No. 7,158,878.

(60) Provisional application No. 60/567,946, filed on May 3, 2004, provisional application No. 60/555,501, filed on Mar. 23, 2004.

(51) Int. Cl.
G01C 21/30 (2006.01)
(52) U.S. Cl. .................................. 701/208; 340/995.14
(58) Field of Classification Search .......... 701/200–213; 340/995.1–995.18
See application file for complete search history.

(56) References Cited

U.S. PATENT DOCUMENTS

| | | | |
|---|---|---|---|
| 4,972,319 | A | 11/1990 | DeLorme |
| 5,051,928 | A | 9/1991 | Gruters |
| 5,263,136 | A | 11/1993 | DeAguiar et al. |
| 5,396,254 | A | 3/1995 | Toshiyuki |
| 5,559,707 | A | 9/1996 | DeLorme et al. |
| 5,613,051 | A | 3/1997 | Iodice et al. |

(Continued)

FOREIGN PATENT DOCUMENTS

CA 2169421 11/1996

(Continued)

OTHER PUBLICATIONS

ESRI Video Clips—Demos—What is GIS?, ESRI GIS and Mapping Software, Mar. 31, 2006, [online] [Retrieved on Mar. 31, 2006] Retrieved from the Internet<URL:http://gis2.esri.com/esriclips/clip.cfm?ClipID=60>.

(Continued)

*Primary Examiner*—Richard M. Camby
(74) *Attorney, Agent, or Firm*—Fenwick & West LLP

(57) ABSTRACT

Digital mapping techniques are disclosed that provide more flexibility to the user through the use of multiple views of map information, including a secondary map and a main map. The secondary map can provide the user with either a zoomed out or in relative to the main map, or a different type of map view (e.g., satellite images). The secondary map can be turned on and off by the user. The secondary map may include one or more viewing frames that indicate views (e.g., current and alternate views) of the main map. The user can move the main map, viewing frame, or secondary map to achieve desired map views. During such movement, the relationship between the main and secondary maps can be synchronous, partially synchronous, or serial.

40 Claims, 9 Drawing Sheets

U.S. PATENT DOCUMENTS

| | | | |
|---|---|---|---|
| 5,646,751 | A | 7/1997 | Motamed et al. |
| 5,710,835 | A | 1/1998 | Bradley |
| 5,760,783 | A | 6/1998 | Migdal et al. |
| 5,802,492 | A | 9/1998 | DeLorme et al. |
| 5,822,123 | A | 10/1998 | Davis et al. |
| 5,848,373 | A | 12/1998 | DeLorme et al. |
| 5,902,347 | A | 5/1999 | Backman et al. |
| 5,910,805 | A | 6/1999 | Hickey et al. |
| 5,938,709 | A | 8/1999 | Hale et al. |
| 6,002,809 | A | 12/1999 | Feig et al. |
| 6,031,963 | A | 2/2000 | Kitamura et al. |
| 6,054,990 | A | 4/2000 | Tran |
| 6,098,015 | A | 8/2000 | Nimura et al. |
| 6,100,897 | A | 8/2000 | Mayer et al. |
| 6,111,583 | A | 8/2000 | Yaron et al. |
| 6,144,338 | A | 11/2000 | Davies |
| 6,182,010 | B1 | 1/2001 | Berstis |
| 6,199,014 | B1 | 3/2001 | Walker et al. |
| 6,202,026 | B1 | 3/2001 | Nimura |
| 6,208,934 | B1 | 3/2001 | Bechtolsheim et al. |
| 6,247,019 | B1 | 6/2001 | Davies |
| 6,252,608 | B1 | 6/2001 | Snyder et al. |
| 6,262,741 | B1 | 7/2001 | Davies |
| 6,266,614 | B1 | 7/2001 | Alumbaugh |
| 6,278,432 | B1 | 8/2001 | Ratnakar |
| 6,278,938 | B1 | 8/2001 | Alumbaugh |
| 6,307,573 | B1 | 10/2001 | Barros |
| 6,321,158 | B1 | 11/2001 | DeLorme et al. |
| 6,331,869 | B1 | 12/2001 | Furlan et al. |
| 6,337,708 | B1 | 1/2002 | Furlan et al. |
| 6,346,938 | B1 | 2/2002 | Chan et al. |
| 6,388,684 | B1 | 5/2002 | Iwamura |
| 6,404,906 | B2 | 6/2002 | Bacus et al. |
| 6,421,053 | B1 | 7/2002 | Johns et al. |
| 6,473,691 | B1 | 10/2002 | Winter et al. |
| 6,496,189 | B1 | 12/2002 | Yaron et al. |
| 6,538,656 | B1 | 3/2003 | Cheung et al. |
| 6,573,905 | B1 | 6/2003 | MacInnis et al. |
| 6,724,382 | B2 | 4/2004 | Kenyon et al. |
| 6,826,472 | B1 | 11/2004 | Kamei et al. |
| 7,050,068 | B1 | 5/2006 | Bastos et al. |
| 7,081,902 | B1 | 7/2006 | Crow et al. |
| 7,158,878 | B2 | 1/2007 | Rasmussen et al. |
| 7,222,306 | B2 | 5/2007 | Kaasila et al. |
| 7,260,474 | B1 | 8/2007 | Thayathil et al. |
| 7,379,811 | B2 | 5/2008 | Rasmussen et al. |
| 7,451,041 | B2 | 11/2008 | Laumeyer et al. |
| 7,542,882 | B2 * | 6/2009 | Agrawala et al. ............... 703/2 |
| 7,565,240 | B2 * | 7/2009 | Tomizawa .................... 701/202 |
| 2001/0050999 | A1 | 12/2001 | Bacus et al. |
| 2002/0067353 | A1 | 6/2002 | Kenyon et al. |
| 2002/0067374 | A1 | 6/2002 | Kenyon |
| 2002/0067379 | A1 | 6/2002 | Kenyon et al. |
| 2002/0159657 | A1 | 10/2002 | DeLorme |
| 2002/0163654 | A1 | 11/2002 | Levantovsky |
| 2003/0095135 | A1 | 5/2003 | Kaasila et al. |
| 2004/0075660 | A1 | 4/2004 | Liao et al. |
| 2004/0145599 | A1 | 7/2004 | Taoka et al. |
| 2005/0122294 | A1 | 6/2005 | Ben-David et al. |
| 2005/0131634 | A1 | 6/2005 | Ignatin |
| 2005/0171686 | A1 | 8/2005 | Davis |
| 2005/0270311 | A1 | 12/2005 | Rasmussen et al. |
| 2005/0286493 | A1 | 12/2005 | Angelhag |
| 2006/0017562 | A1 | 1/2006 | Bachelder |
| 2006/0041375 | A1 | 2/2006 | Witmer et al. |
| 2006/0075442 | A1 | 4/2006 | Meadow |
| 2006/0173841 | A1 | 8/2006 | Bill |
| 2006/0200383 | A1 | 9/2006 | Arutunian et al. |
| 2006/0241859 | A1 | 10/2006 | Kimchi et al. |
| 2006/0271286 | A1 | 11/2006 | Rosenberg |
| 2007/0010942 | A1 | 1/2007 | Bill |
| 2007/0011145 | A1 | 1/2007 | Snyder |
| 2007/0080830 | A1 | 4/2007 | Sacks |
| 2007/0096945 | A1 | 5/2007 | Rasmussen et al. |
| 2007/0106468 | A1 | 5/2007 | Eichenbaum et al. |
| 2007/0154067 | A1 | 7/2007 | Laumeyer et al. |
| 2007/0198182 | A1 | 8/2007 | Singh |
| 2007/0203643 | A1 | 8/2007 | Ramaswamy et al. |
| 2007/0239348 | A1 | 10/2007 | Cheung |

OTHER PUBLICATIONS

Gleicher, M. et al., "Through-the-Lens Camera Control," Proceedings SIGGRAPH '92, Computer Graphics, Jul. 1992, pp. 331-340, vol. 26, No. 2.

Canadian Office Action, Canadian Patent Application No. 2,560,386, Oct. 29, 2007, 3 pages.

Canadian Office Action, Canadian Patent Application No. 2,560,560, Feb. 5, 2008, 3 pages.

Indian Office Action, Indian Patent Application No. 1237/MUMNP/2006, Nov. 13, 2007, 2 pages.

Indian Office Action, Indian Patent Application No. 1247/MUMNP/2006, Nov. 8, 2007, 2 pages.

PCT International Search Report and Written Opinion, PCT/US06/49400, Feb. 12, 2008, 9 pages PCT International Search Report and Written Opinion, PCT/US05/09538, Sep. 20, 2007, 7 pages.

Cosman, M., "Global Terrain Texture: Lowering the Cost," Proceedings of the 1994 Image VII Conference, Tempe, Arizona: The Image Society, pp. 53-64.

Crawford, Clayton, et al., Fast 3D Visualization of Large Image Datasets in a GIS, Earth Observation Magazine, vol. 12, No. 9, Dec. 2003, USA, pp. 1-5.

Dragan, Richard V., MSB Virtual Earth 1.0, MSB Virtual Earth 1.0 review by PC Magazine, Jul. 26, 2005, [online], [retrieved on Aug. 1, 2005]. Retrieved from the Internet <URL: http://www.pcmag.com/article2/0,1895,1840750,00.asp>, pp. 1-2.

Leclerc et al., "TerraVision: A Terrain Visualization System," SRI International, Menlo Park, California, Tech. Note No. 540, Apr. 22, 1994.

MapQuest.Com Maps, Directions and More, [online], [retrieved on Aug. 1, 2005]. Retrieved from the Internet <URL: http://www.mapquest.com>.

Montalbano, Elizabeth, Microsoft Takes on Google with Virtual Earth, IDG News Service, Jul. 25, 2005, [online], [retrieved on Aug. 1, 2005]. Retrieved from the Internet <URL: http://www.infoworld.com/article/05/07/25/HNmsvirtualearth_1.html>.

MSN Maps & Directions, [online], [retrieved on Aug. 1, 2005]. Retrieved from the Internet <URL: <http://maps.msn.com/(ogxuearj4ya5au55fogcdzbt)/Home.aspx>.

MSN Virtual Earth—Microsoft Internet Explorer, [online], [retrieved on Aug. 1, 2005]. Retrieved from the Internet URL:http://virtualearth.msn.com, pp. 1-3.

MSN Virtual Earth To Take On Google Earth, [online], [retrieved on Aug. 1, 2005]. Retrieved from the Internet <URL: http://blog.searchenginewatch.com/blog/050523-125208>, pp. 1-4.

MultiMap.com—Online Maps Everywhere, [online], [retrieved on Aug. 1, 2005]. Retrieved from the Internet <URL: http://multimaps.com>.

NASA World Wind, [online], [retrieved on Aug. 1, 2005]. Retrieved from the Internet <URL: http://worldwind.arc.nasa.gov/>, pp. 1-2.

TerraServer-USA, [online], [retrieved on Aug. 1, 2005]. Retrieved from the Internet <URL: http://terraserver.homeadvisor.msn.com/>.

whereis.com—Search Australian Maps, [online], [retrieved on Aug. 1, 2005]. Retrieved from the Internet <URL: http://www.whereis.com/whereis/home.jsp>.

Yahoo! Maps, Driving Directions, and Traffic, [online], [retrieved on Aug. 1, 2005]. Retrieved from the Internet <URL: http://maps.yahoo.com>.

Ho, T. K., et al., "Word Recognition with Multi-Level Contextual Knowledge," Center for Document Analysis and Recognition, State University of New York at Buffalo, pp. 1-11, Buffalo, New York.

Rabinovich, B., et al., "Visualization of Large Terrains in Resource-Limited Computing Environments," Proceedings of the 8$^{th}$ IEEE Visualization '97 Conference, Oct. 19-24, 1997, pp. 95-102, Phoenix, Arizona.

Amendment and Response, U.S. Appl. No. 09/729,613, Oct. 2, 2003, 13 pages.

"ESRI Video Clips, What is GIS?" Jul. 25, 2006, [online] [Retrieved on Jul. 25, 2006] Retrieved from the Internet<URL:http://gis.esri.com/esriclips/clip.cfm?ClipID=60>.

First Office Action of China State Intellectual Property Office, Chinese Patent Application No. 200580013512.0, May 8, 2009, 10 pages.

First Office Action of China State Intellectual Property Office, Chinese patent Application No. 200580013912.1, Aug. 28, 2009, 16 pages.

Office Action dated Jul. 2, 2003, U.S. Appl. No. 09/726,613, 8 pages.

Office Action dated Nov. 26, 2003, U.S. Appl. No. 09/729,613, 8 pages.

Office Action dated Sep. 15, 2003, U.S. Appl. No. 09/768,928, 13 pages.

Office Action issued by Canadian Intellectual Property Office, Canadian Patent Application No. 2,560,560, Mar. 18, 2009, 2 pages.

Office Action issued by Canadian Intellectual Property Office, Canadian Patent Application No. 2,560,558, Aug. 7, 2009, 3 pages.

Brenner, C., et al., "Extracting Landmarks For Car Navigation Systems Using Existing GIS Databases And Laser Scanning," ISPRS Archives, Sep. 2003, 6 pages, vol. XXXIV, Part 3/W8.

Burnett, G.E., "Turn right at the King's Head" Drivers' requirements for route guidance information, A Doctoral Thesis of Loughborough University, Nov. 1998, 341 pages.

Supplementary European Search Report, European Patent Application No. EP 05729642, May 12, 2010, 5 Pages.

* cited by examiner

SECONDARY MAP IN DIGITAL MAPPING SYSTEM

RELATED APPLICATIONS

This application is a continuation-in-part of U.S. application Ser. No. 11/051,534, filed Feb. 5, 2005 now U.S. Pat. No. 7,158,878, titled "A Digital Mapping System", which claims the benefit of U.S. Provisional Application Nos. 60/567,946, filed May 3, 2004, and 60/555,501, filed Mar. 23, 2004. In addition, this application is related to U.S. application Ser. No. 11/088,542, filed Mar. 23, 2005, titled "Generating and Serving Tiles in a Digital Mapping System". Each of these applications is herein incorporated in its entirety by reference.

FIELD OF THE INVENTION

The invention relates to digital mapping systems, and more particularly, to an secondary map that can be synchronized with a main map to improve user experience.

BACKGROUND OF THE INVENTION

Computerized mapping systems have been developed to search for, identify, and discover information about geographic locations. One form of such computerized mapping systems includes travel-planning Internet websites. With an excess of 50 million unique monthly users, such map sites are a very popular offering. Examples of such sites include AOL's MapQuest, Yahoo's Telcontar-based maps, and Microsoft's MapPoint.net suite. Such sites all work along the lines of a common model, as will now be described.

When a web user asks for a new map view (e.g., by entering a postal address, or by clicking a navigation link next to a current map view), the user's web browser sends to a web server a request indicating the boundaries of the new map view. The web server in turn extracts the corresponding vector-based map data from a database, and draws a bitmap image of the map. The server then converts the bitmap to an image format supported by the user's web browser and returns the image, sometimes embedded in HTML, to the user's web browser so that it can be displayed. Other map websites, such as Britain's MultiMaps or Australia's WhereIs utilize a raster-based map database instead. In these cases, it is not necessary to extract vectors and draw a map image. Rather, these functions are replaced by simply extracting the appropriate part of a larger, pre-rendered image.

Whether vector-based or raster-based, such existing map systems typically provide a single view of map information. Thus, when a user is zoomed on a particular map area, areas outside that zoomed area cannot be scene or otherwise referenced by the user. In such a case, the user may need to pan in a certain direction to view a new map area. However, if the user does not know which direction to pan, then the user will have to zoom out first, until the desired map area is in view, and then zoom back on that desired area. In this sense, a single view map limits the amount of flexibility available to the user.

What is needed, therefore, are digital mapping techniques that provide more flexibility to the user through the use of multiple views of map information

SUMMARY OF THE INVENTION

One embodiment of the present invention provides a digital mapping method that includes displaying a main map and a secondary map, wherein upon being enabled, the secondary map is displayed within space previously occupied by the main map. The method may further include adjusting zoom level of the secondary map independently of main map zoom level, and/or resizing the secondary map in response to user input. In one particular case, upon the secondary map being disabled, the method further includes removing the secondary map from display and displaying the main map over space previously occupied by the secondary map. The method may include maintaining a relative zoom level difference between the main map and the secondary map when allowed by zoom level limits, as zoom level of the main map is adjusted. In one such case, if the relative zoom level difference cannot be maintained due to a zoom level limit associated with the secondary map, the method further includes automatically reinstating the relative zoom level difference when the secondary map zoom level limit is no longer a limit due to main map zoom level changes. The method may include displaying a viewing frame on one of the main map or the secondary map, wherein the map that has the viewing frame shows a geographic area that is larger than geographic area shown by the other map. The method can be programmed or otherwise configured, for example, to enable each of the main map and the secondary map to be independently set to one of a traditional type, satellite type, or hybrid type map.

Another embodiment of the present invention provides a machine-readable medium (e.g., compact disk, diskette, server, memory stick, or hard drive) encoded with instructions, that when executed by a processor, cause the processor to carry out a digital mapping process. This process can be, for example, similar to or a variation of the previously described method.

Another embodiment of the present invention provides a digital mapping system. In this example, the system includes a main map for displaying a first map view, and a secondary map for displaying a second map view. Upon being enabled, the secondary map is displayed within space previously occupied by the main map. The system may be further programmed or otherwise configured to adjust zoom level of the secondary map independently of main map zoom level, and/or resize the secondary map in response to user input. In one particular case, upon the secondary map being disabled, the system is further configured to remove the secondary map from display and display the main map over space previously occupied by the secondary map. The system may be configured to maintain a relative zoom level difference between the main map and the secondary map when allowed by zoom level limits, as zoom level of the main map is adjusted. In one such case, if the relative zoom level difference cannot be maintained due to a zoom level limit associated with the secondary map, the system may be further configured to automatically reinstate the relative zoom level difference when the secondary map zoom level limit is no longer a limit due to main map zoom level changes. The system may be configured to provide a viewing frame on one of the main map or the secondary map, wherein the map that has the viewing frame shows a geographic area that is larger than geographic area shown by the other map. In one particular case, the viewing frame, secondary map, and main map move in a synchronous relationship, in response to user input. In another particular case, the viewing frame, secondary map, and main map move in a serial relationship, in response to user input. In another particular case, the viewing frame, secondary map, and main map move in a partially synchronous relationship, in response to user input. The system can be configured to enable each of the main map and the secondary map to be independently set to one of a traditional type, satellite type, or hybrid type map. Thus, the user could, for example, simultaneously view a detailed close-up satellite map on the secondary map, and a traditional zoomed out map on the main map.

Another embodiment of the present invention provides a method for moving a secondary map and a main map of a digital mapping system. This example method is as follows. In response to a user moving a main map, the method includes moving a secondary map associated with the main map. In response to the user moving a viewing frame on the secondary map, the method includes moving the main map based on movement of the viewing frame. In response to the user moving the secondary map, the method includes moving the main map based on movement of the secondary map. In one particular case, the zoom level of the secondary map can be adjusted independently of main map zoom level. In one such configuration, zooming of the secondary map can optionally be synchronized with zooming of the main map, if so desired. In another particular case, the digital mapping system includes a client-side that requests map data from a server-side, and the method is carried out on the client-side. At least two of the viewing frame, secondary map, and main map can be programmed or otherwise configured to move in a synchronous relationship, in response to user input. Alternatively, or in addition to, at least two of the viewing frame, secondary map, and main map can be configured to move in a serial relationship, in response to user input. Parameters of the secondary map may be configurable by a user. For example, configurable parameters of the secondary map may include zoom level, synchronization with main map movement, and/or map type (e.g., which allows the user to configure the secondary map to include satellite images). The secondary map can be configured to be resizable (e.g., user can create personal "default" size secondary map that is used when secondary map is enabled). In response to the user moving the main map, the method may include holding the viewing frame in place as a view of the secondary map framed by the viewing frame changes. In response to the user moving the viewing frame, the method may include holding the secondary map in place as the viewing frame moves over it. In one such case, upon user release of the viewing frame, the method further includes moving the secondary map to center the released viewing frame. In response to the user moving the secondary map, the method may include holding the viewing frame in place as a view of the secondary map framed by the viewing frame changes. In response to the user moving the main map, the method may include holding the secondary map and an alternate position viewing frame in place as the main map and the viewing frame move, and upon user release of the main map, moving the secondary map to center the viewing frame. In response to the user moving an alternate position viewing frame, the method may include holding the main map, the secondary map, and the viewing frame in place. In one such case, upon user release of the alternate position viewing frame, the method further includes moving the main map to show a view framed by the alternate position viewing frame, moving the viewing frame to show the view framed by the alternate position viewing frame, and moving the secondary map to center the alternate position viewing frame and the viewing frame. In another such case, upon user release of the alternate position viewing frame, the method further includes moving the main and secondary maps in sync, so the main map shows a view framed by the alternate position viewing frame and the alternate position viewing frame is centered in the secondary map. In response to the user moving the secondary map, the method may include holding the main map and an alternate position viewing frame in place, and upon user release of the secondary map, moving the main map and the viewing frame to show a view framed by the alternate position viewing frame.

Another embodiment of the present invention provides a machine-readable medium (e.g., compact disk, diskette, server, memory stick, or hard drive) encoded with instructions, that when executed by a processor, cause the processor to carry out a process for moving a secondary map and a main map of a digital mapping system. This process can be, for example, similar to or a variation of the previously described method.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1A:
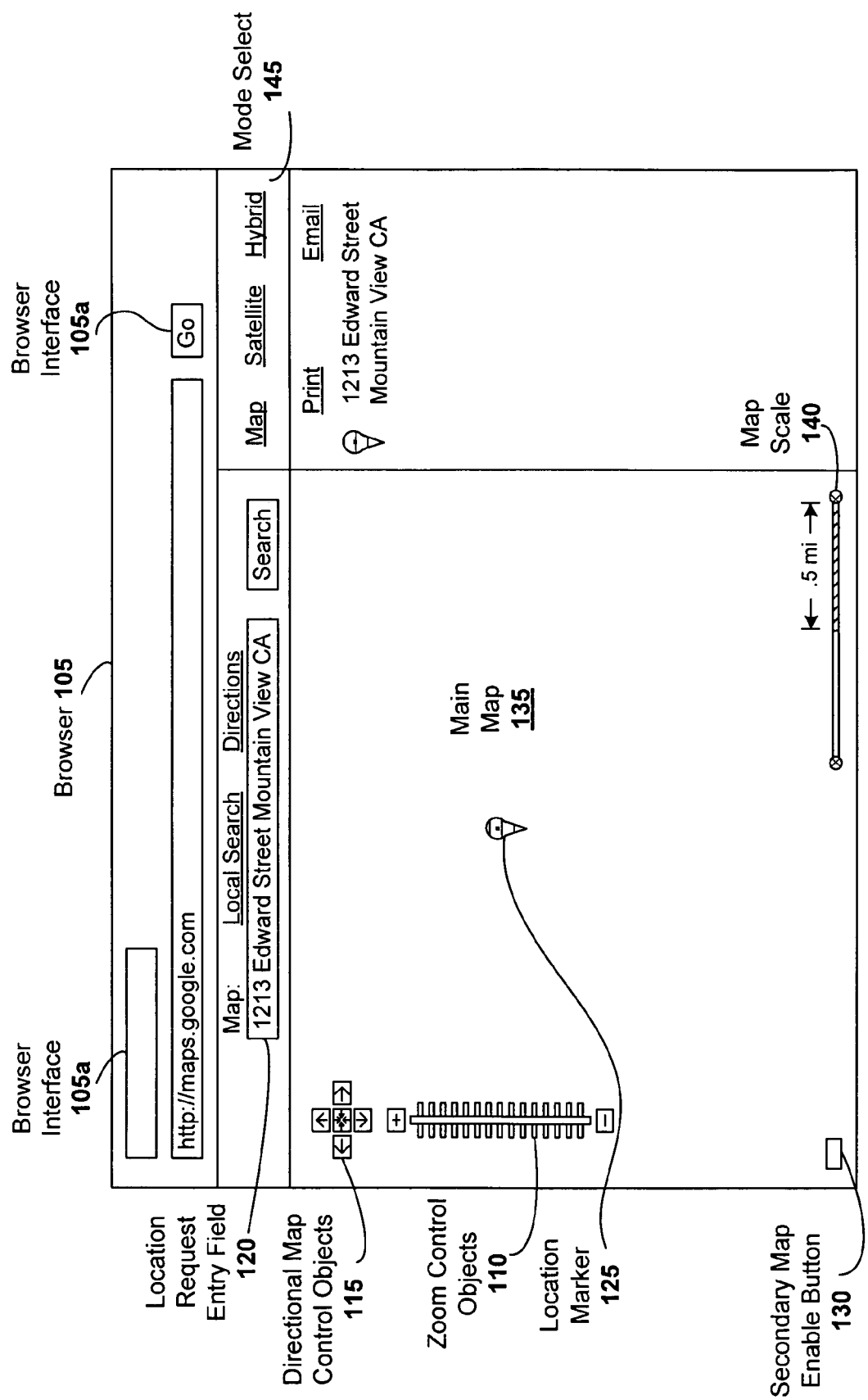
FIGS. 1a and 1b illustrate a secondary map and main map of a digital mapping systems, in accordance with an embodiment of the present invention.

Digital mapping techniques are disclosed that provide more flexibility to the user through the use of multiple views of map information, including a main map and a secondary map, which can be located, for instance, in a corner of the main map.

The secondary map can provide the user with either a zoomed out map view (relative to the main map) for orientation (e.g., so as to enable informed panning), a zoomed in map view for specific area details, or a different type of map view relative to the main map view (e.g., main map can be a traditional drawn map and secondary map can be a satellite image or a hybrid of both traditional drawn map and satellite images). The secondary map can be turned on and off by the user. In cases where the secondary map shows a larger geographic area than the main map, the secondary map may include one or more viewing frames. For instance, one viewing frame may show the current position of the main map view, and another viewing frame can show the future position of the main map view based on user-initiated map movement. When neither of the main or secondary maps are being moved, the viewing frames appear as a single frame in the center of the secondary map. The user can move the main map, the viewing frames, or the secondary map to achieve desired map views. During such map movement, the relationship between the main map and the secondary map can be synchronous, partially synchronous, or serial.

In a fully synchronized mode, the main map and the secondary map can move or zoom in sync, whenever the main map is moved or zoomed. In one such embodiment, the secondary map can be zoomed independently of the main map, so as to allow the user to focus on particular map details as desired using the secondary map, without impacting the main map view. In a fully synchronized mode, the viewing frames do not move (unless moved by user), and stay in position as the view of the secondary map framed by the viewing frame changes.

In a serial mode, the main map and secondary map move at separate times. For instance, if the user drags the secondary map (e.g., by clicking and holding the cursor on the secondary map but outside the viewing frames), the current position viewing frame remains locked to the secondary map and therefore moves with the secondary map (i.e., the map view in the current position viewing frame does not change). The alternate position viewing frame, however, remains in the center of the secondary map (as the view of the secondary map framed by the alternate position viewing frame changes), so as to show where the main map view will move to when the user releases the secondary map. After the user ends the drag or move of the secondary map, the main map view moves so that it shows the view within the alternate position viewing frame. At or about the same time, the current position viewing frame moves back to the center of the secondary map view (which rejoins the current position viewing frame with the alternate position viewing frame).

In a partially synchronized mode, the main map and the secondary map still move or zoom in sync, but the viewing frames move separately. For instance, if the user drags on or inside the viewing frames, only the alternate position viewing frame moves initially, so as to indicate the future position of the main map. When the user stops the drag or move of the alternate position viewing frame, the main map and secondary map then move in sync, so that the main map moves to the view shown in the alternate position viewing frame, and the secondary map moves to center the alternate position viewing frame on the secondary map (which rejoins the alternate position viewing frame with the current position viewing frame).

Interface elements can also be provided to allow the user to zoom in and out in the secondary map, and store the zoom level relative to the main map zoom level. When the user zooms in or out in the main map view, the same zoom level changes can be applied to the secondary map (when possible). If not possible (because the desired zoom level is beyond the min or max zoom levels available), the secondary map can be zoomed to either the max or min zoom level that is closest to the desired zoom level. In one such case, the stored relative difference in zoom levels between the main and secondary maps is maintained whenever possible. For instance, assume the zoom level range for each map is levels 1 to 10, and further assume the relative zoom level difference is 4. Further, assume that the zoom level of the main map begins at level 5 and the zoom level of the secondary map is level 9. Here, the stored relative zoom level difference of 4 is maintained. However, if the zoom level of the main map is increased by two levels to level 7, the zoom level of the secondary map can only be increased to level 10 (the max zoom level in this example). Thus, at this particular point, the relative zoom level difference is only 3. However, once the zoom level of the main map is changed to level 6 or lower, the stored relative zoom level difference of 4 will automatically be re-instated. The user can also turn off the synchronization of zoom levels from the main map to the secondary map. Other interface elements can be used as well, as will be apparent in light of this disclosure.

Main Map with Optional Secondary Map

Figure 1B:
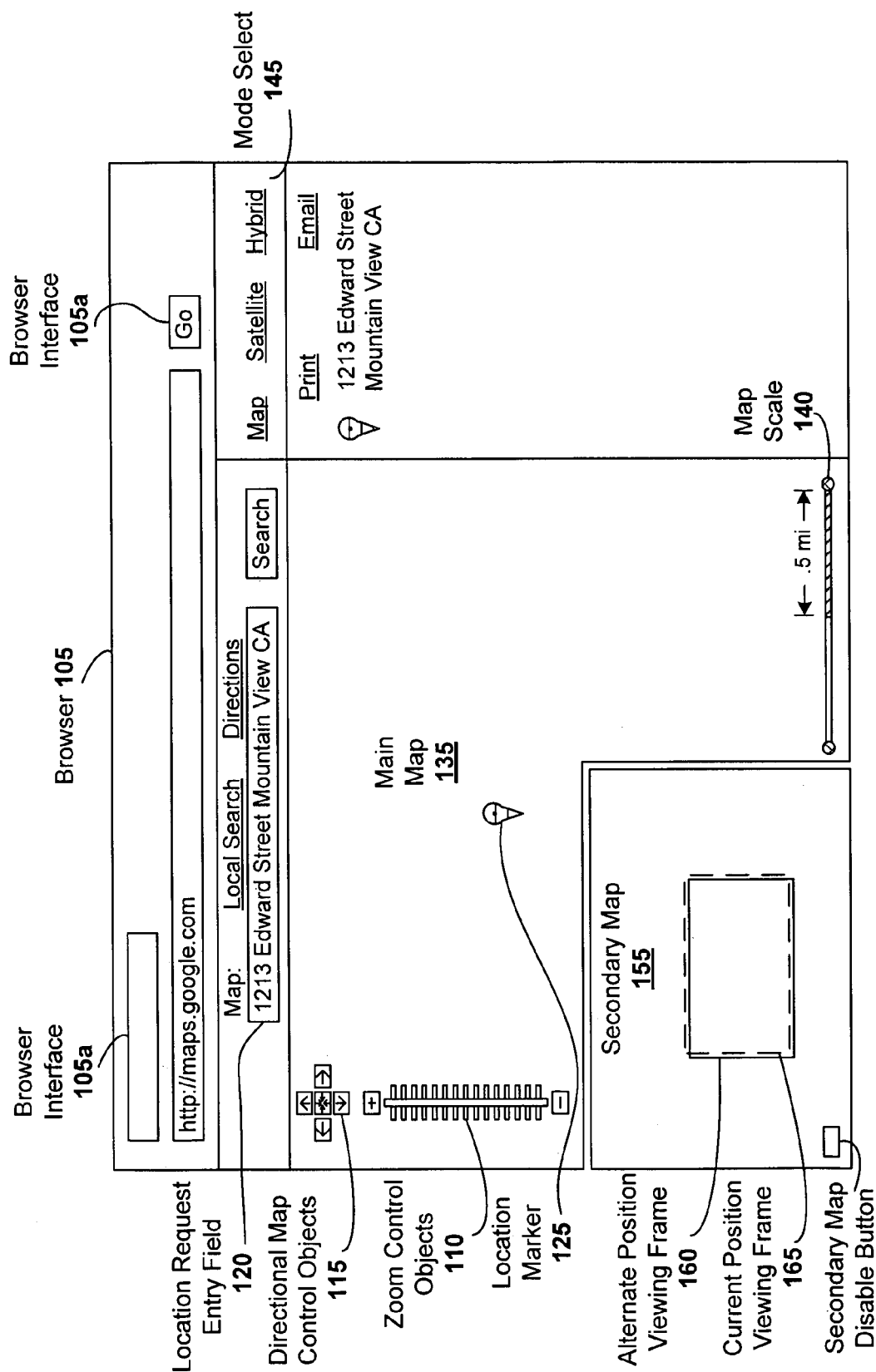

FIGS. 1a and 1b illustrate a secondary map and main map of a digital mapping system, in accordance with an embodiment of the present invention. As can be seen, a user has accessed a remote server of the digital mapping system through use of a browser 105, and requested a digital map for a specific address (e.g., 1213 Edward Street Mountain View Calif.) by typing that address into the location request entry field 120, and then clicking search. The requested map is displayed in the user's browser 105, which includes a number of conventional browser interfaces 105a, such as back, front, and go buttons. Other typical browser interface features and functionality can be included as well.

The requested digital map has a number of map features, including directional map control objects 115, zoom control objects 110, a location marker 125 (to highlight the requested address), a map scale 140, and map/satellite/hybrid mode select controls 145. Note in this example that a traditional drawn map is indicated with "Map" while satellite and hybrid maps are indicated with "Satellite" and "Hybrid" respectively. Example such features and functionality of the map, as well as others (e.g., information windows and high resolution printing) are discussed in detail in the previously incorporated U.S. application Ser. Nos. 11/051,534 and 11/088,542, which describe tile-based mapping systems. Note, however, a secondary map configured in accordance with the principles of the present invention can also be used with other mapping systems, such as vector-based and raster-based mapping systems, and are not intended to be limited to tile-based systems.

The requested map also includes a main map portion 135, and a secondary map enable button 130, as shown in FIG. 1a. Note that the secondary map enable button 130 is located in the lower left corner of the main map 135 in this example embodiment. In other embodiments, the secondary map enable button 130 can be located in the lower right corner of the main map 135, or in any other convenient location on the main map 135, depending on factors such as location of the secondary map and layout of other map features. If the user selects the secondary map enable button 130, than a secondary map 155 is provided, as shown in FIG. 1b. The secondary map 155 includes a secondary map disable button 150 (similarly located to the secondary map enable button 130 for user convenience in this example). Thus, the secondary map can be disabled or enabled by the user. Tool tips can be used to show the user that the secondary map enable button 130 and the secondary map disable button 150 can be selected to enable and disable the secondary map, respectively.

The secondary map 155 also includes an alternate position viewing frame 160 (solid line) and a current position viewing frame 165 (dashed line). These viewing frames are shown as distinct frames to facilitate discussion, but generally appear as a single frame after any user initiated movement has settled. As will be apparent in light of this disclosure, the viewing frames 160/165 provide the user with an interface and visual aid in carrying out user-initiated map movements, whether by moving the secondary map 155, the main map 135, or the viewing frames 160 or 165. The shape of the viewing frames can be, for instance, square or rectangular, although any desired shape (regular or irregular) can be used.

This secondary map functionality (e.g., enabling/disabling, viewing frames, and user configurability) can be modified and refined to suit the particulars of a given application and desired secondary map performance. Numerous embodiments are possible, and the present invention is not intended to be limited to any one such configuration. Conventional map drawing techniques, or those discussed in U.S. application Ser. No. 11/051,534 can be used to draw the secondary map 155, once enabled by the user.

Secondary Map

Figure 2A:
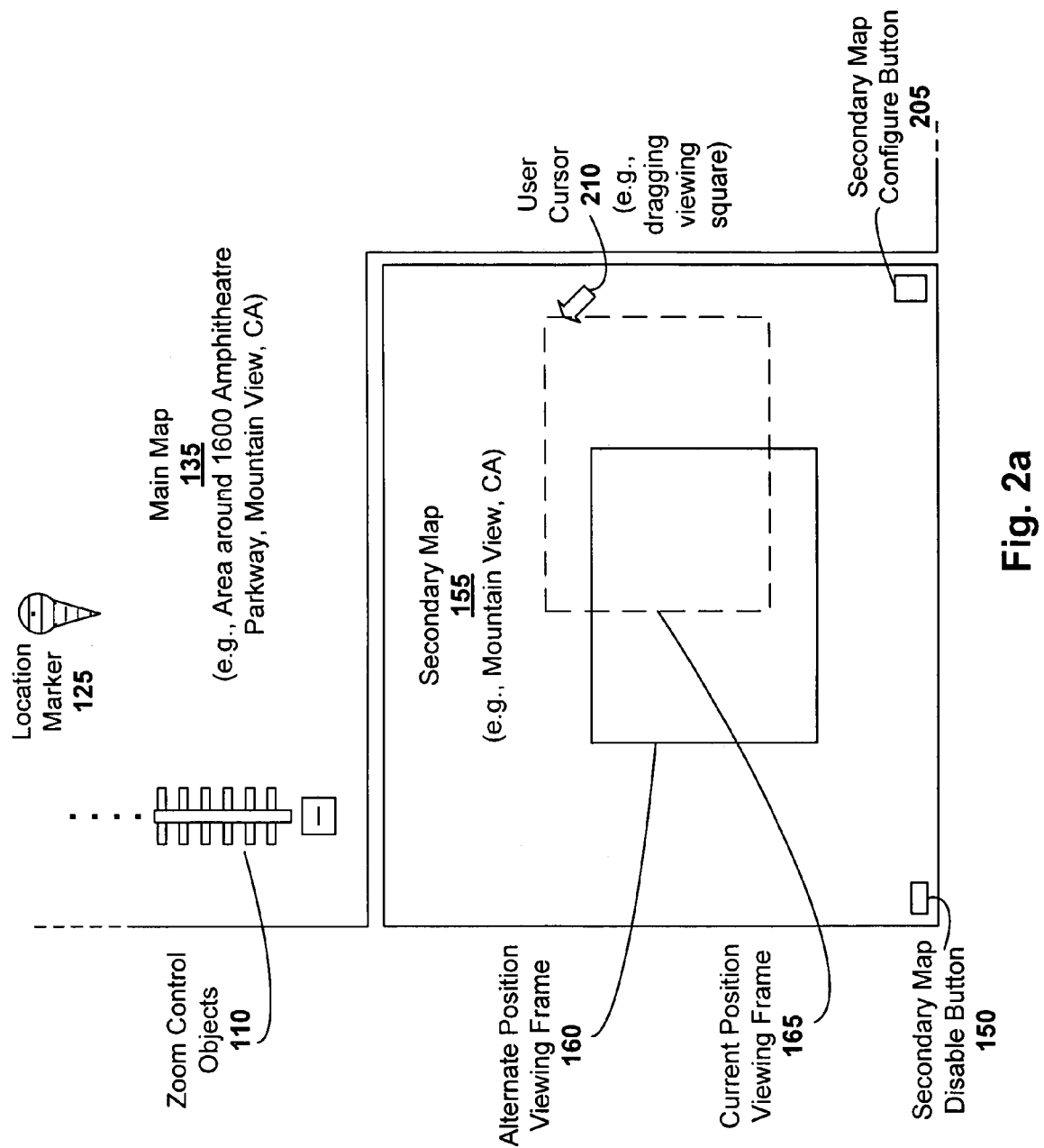
FIGS. 2a and 2b illustrate a user configurable secondary map, in accordance with an embodiment of the present invention.
Figure 2B:
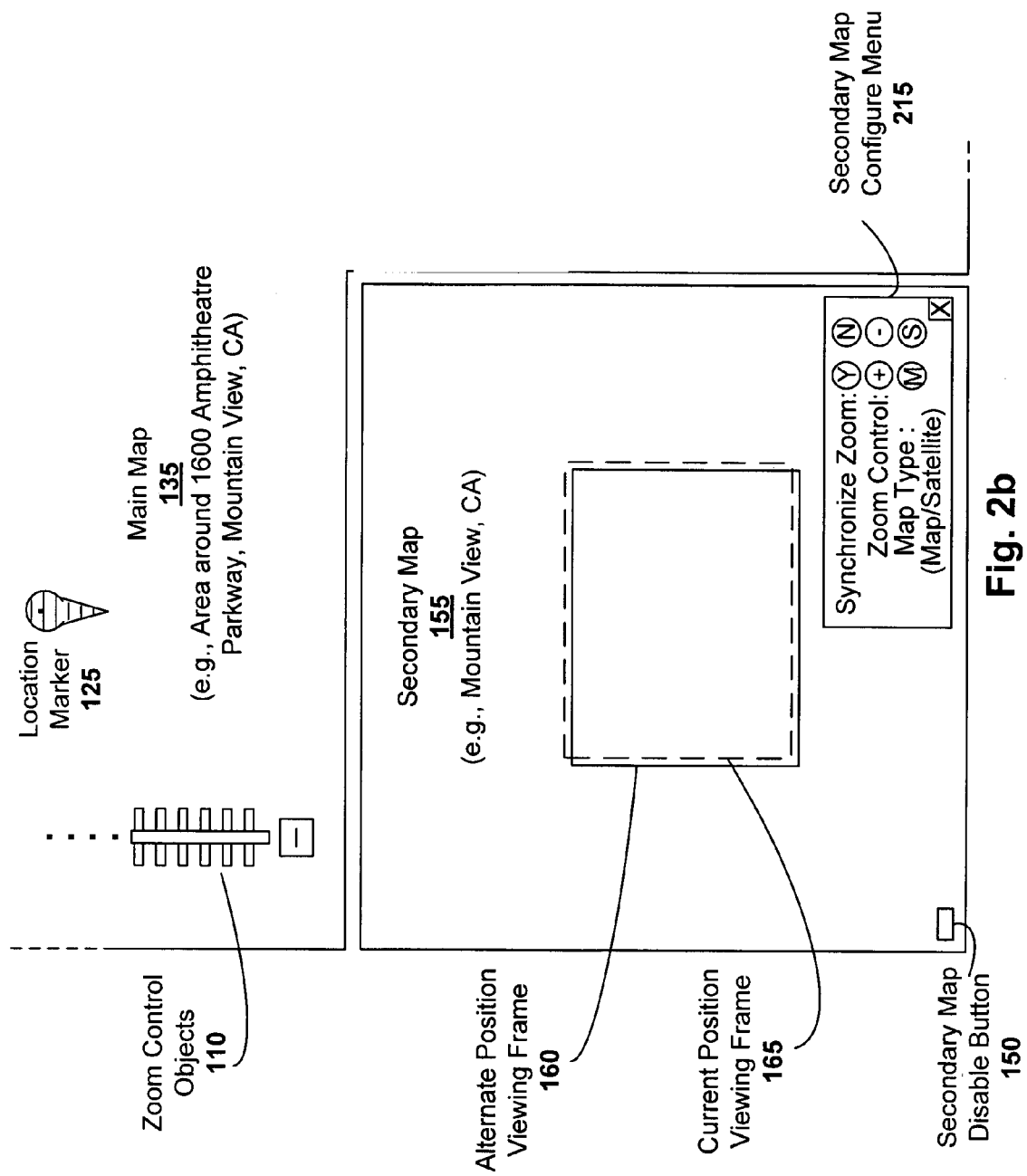

FIGS. 2a and 2b illustrate a user configurable secondary map, in accordance with an embodiment of the present invention. In this example, when the secondary map 155 is enabled, it is drawn in the lower left corner of the main map 135. Note that the secondary map 155 in this embodiment is distinct and separate from the main map 135, but effectively in-laid within the original space occupied by the main map. As previously discussed, the viewing frames 160/165 can be provided when the geographic area covered by the secondary map 155 is larger than the geographic area covered by the main map 135. In this example, the secondary map 155 covers the city of Mountain View, Calif. (or a larger geographic area such as Silicon Valley or the Bay Area), and the main map 135 covers the smaller geographic area around 1600 Amphitheatre Parkway, Mountain View Calif.

In the case where the area shown by the secondary map 155 is equal to or smaller than the area shown by the main map 135, then there are no viewing frames 160/165. In such a situation, if the user zooms the secondary map to include an area that is larger than the main map 135, then the viewing frames 160/165 can be provided as described herein. In one particular embodiment, when the user hovers (with the cursor 210) over the viewing frames 160/165, a tool tip appears, indicating, for instance, "Drag viewing frame to move main map." In an alternative embodiment, if the area shown by the secondary map 155 becomes equal to or smaller than the area shown by the main map 135, then the viewing frames 160/165 can be provided on the main map instead, where they will function just as they do on the secondary map. In such a situation, if the user zooms the secondary map to include an area that is larger than the main map 135, then the viewing frames 160/165 can be switched back from the main map to the secondary map.

As can be seen, the user in this example case is using an input device (e.g., mouse or touch pad or stylus/touchscreen arrangement) to manipulate an arrow-shaped cursor 210 to achieve synchronous movement of the current viewing frame 165 and the main map 135. In particular, the user is dragging the current viewing frame 165 to a new location on the secondary map 155. As the user drags the current viewing frame 165 (e.g., by clicking and holding the cursor 210 on the edge or within the current viewing frame 165), the map view of the main map 135 changes in sync with the map view within the current viewing frame 165. Upon release of the cursor 210, the secondary map 155 (along with the current viewing frame 165 held in the location it was released) moves to center the current viewing frame 165 (so that it is back in the same location as the alternate viewing frame 160). In actual implementation, it is not necessary to show the alternate position viewing frame 160 as the user moves the current position viewing frame 165. It is shown here to facilitate discussion and understanding, but can also provide the user with an additional visual aid to improve the user's experience in interacting with the map system.

Other moving schemes will be apparent in light of this disclosure. For instance, movement can be initiated by the user dragging, panning, or otherwise moving the main map, secondary map, or a viewing frame. And as previously discussed, the relationship between the main map and the secondary map can be synchronous, partially synchronous, or serial.

A number of user interface options are available. For example, if the user clicks the secondary map configure button 205, a secondary map configure menu 215 opens or otherwise appears (as shown in FIG. 2b). In one particular embodiment, when the user hovers (with the cursor 210) over the secondary map configure button 205, a tool tip appears, indicating, for instance, "Click for secondary map configuration." In the embodiment shown in FIG. 2b, configuration options for the secondary map 155 include a synchronize zoom feature, a zoom control feature, and a map type feature. Other configurable features can be used here as well, and the present invention is not intended to be limited to any one embodiment. For instance, the configuration options can be programmed or otherwise configured to allow the user to select the movement mode (e.g., synchronized, partially synchronized, or serial). Also, the user can disable synchronization so that one map can be explored without impacting the other map. In such a case, the configuration options would include, for instance, an "independent map movement" option or the like. Once this option was disabled by the user, the maps would then sync up so that both maps displayed the area of interest identified by the user on the independently used map.

If the user selects the N or "No" button of the synchronize zoom feature (or otherwise disables the synchronize zoom feature), then the zoom level of the main map 135 can be adjusted independently of the zoom level of the secondary map 155. If the user selects the Y or "Yes" button to enable the synchronize zoom feature, then the zoom level of the main map 135 is synchronized to the zoom level of the secondary map 155. Thus, an increase of three zoom levels of the main map 135 will cause an increase of three zoom levels of the secondary map 155 (if possible). Likewise, a decrease of two zoom levels of the secondary map 155 will cause a decrease of two zoom levels of the main map 135. Also, as previously explained, the relative zoom level difference can be stored and maintained when synchronized zoom is enabled, even after a period where the relative zoom level difference is compressed due to limitation associated with a max or min zoom level.

The zoom control feature allows the user to adjust the zoom level of the secondary map 155, if so desired. In this example, each time the user selects the "+" control button, the zoom level of the secondary map 155 increases by one (until the max zoom level is achieved). Likewise, each time the user selects the "−" control button, the zoom level of the secondary map 155 decreases by one (until the min zoom level is achieved). Recall that the zoom control of the secondary map 155 can be manipulated without impacting the zoom level of the main map 135, thereby allowing the user to zoom in for a desired level of detail using the secondary map 155. The map type feature allows the user to select the type of map that is presented in the secondary map 155. In this example embodiment, the map type can either be a traditional map (by selecting the M button) or satellite image (by selecting the S button). Other embodiments may include an H button, for a hybrid map type that includes a satellite image with overlaid traditional map graphics to enhance user's visual experience. Thus, the main map 135 can be at one zoom level and displaying one map type (e.g., traditional map of San Francisco), while the secondary map 155 can be at another zoom level (higher or lower than that main map zoom level) and displaying another map type (e.g., detailed satellite image of Cole Valley within San Francisco).

Figure 2C:
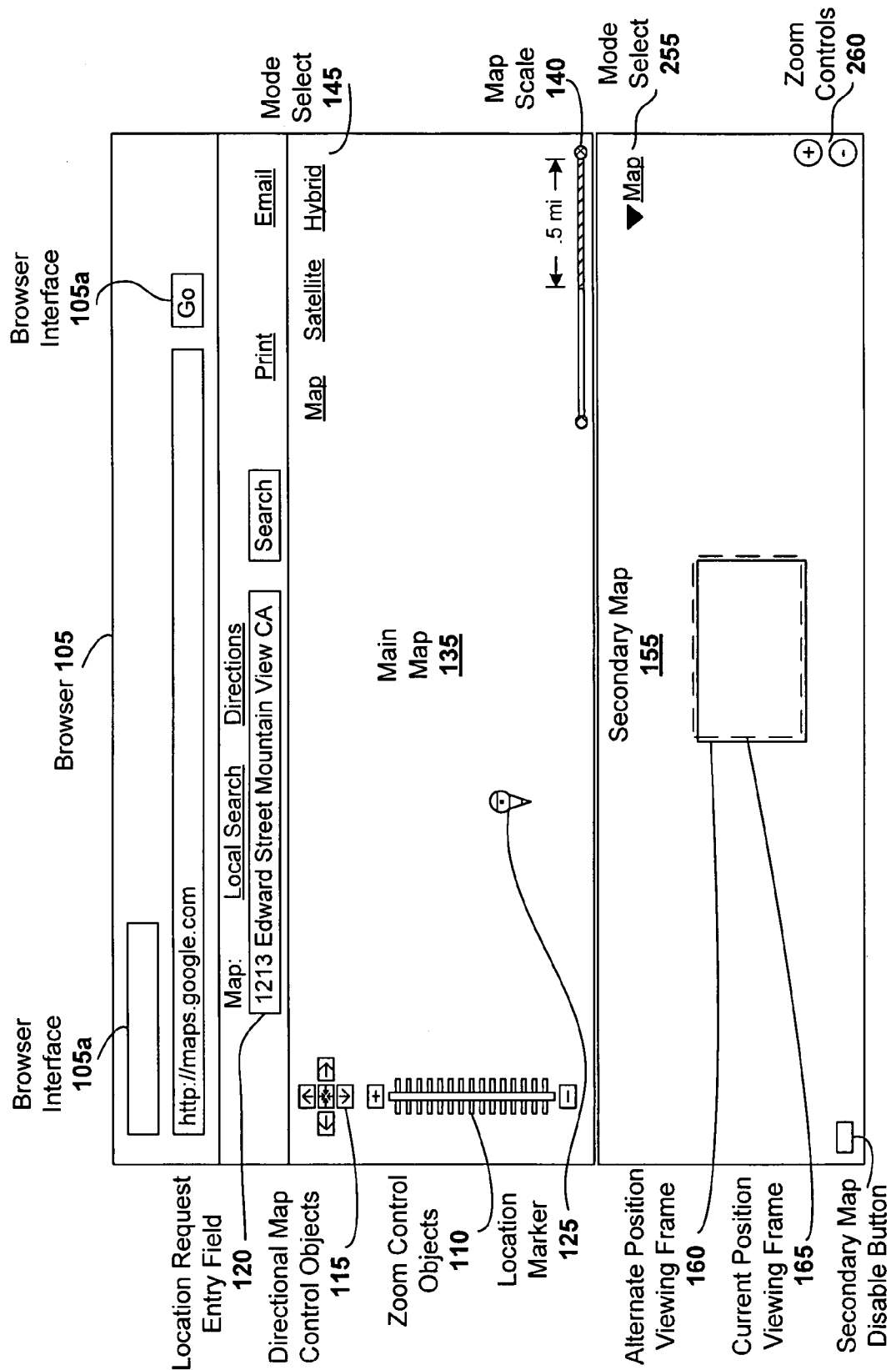
FIG. 2c illustrates a secondary map and main map of a digital mapping systems, in accordance with another embodiment of the present invention.

If the user clicks the X button of the secondary map configure menu 215 (in the lower left corner), the menu 215 will close and is replaced by the secondary map configure button 205. In an alternative embodiment, zoom control can be drawn directly on the secondary map 155 (e.g., with "+" and "−" zoom control objects in the upper left corner of the secondary map 155), so that accessing the configuration menu 215 is not necessary. Likewise, the map type can be drawn directly on the secondary map 155 (e.g., with "Map" pull-down menu control object (e.g., with choices of traditional, satellite, and hybrid) in the upper right corner of the secondary map 155), so that accessing the configuration menu 215 is not necessary. One such embodiment is shown in FIG. 2c. Numerous control object and menu schemes can be used here to facilitate the user's use of the secondary map 155.

The secondary map configure button 205 and the secondary map configure menu 215 can be implemented, for example, as an information window as described in the previously incorporated U.S. application Ser. No. 11/051,534. The zoom control objects 110 can be implemented, for example, in a similar fashion as the zoom control objects described in application Ser. No. 11/051,534. Likewise, the traditional, satellite and hybrid map types can be implemented, for example, in a similar fashion as described in that same application. Numerous user interface and configuration schemes can be implemented, using such information windows and user selectable objects.

Each of the main and secondary maps can be generated, served, assembled, and displayed, for example, as described in detail in the previously incorporated U.S. application Ser. Nos. 11/051,534 and 11/088,542. Alternatively, the maps can be provided in response to user input using conventional mapping techniques. JavaScript code in the client can be used to make the changes associated with selecting the secondary map configure button 205, for instance, by replacing the images used in the drawing of the secondary map configure button 205 and secondary map 155 with images used in the drawing of the secondary map configure menu 215, and changing the value of a variable that stores the display mode (where the state of the variable indicates whether the secondary map configure menu 215 open or closed). Drawing the configuration menu 215 can be implemented, for example, using standard HTML and user interface programming techniques.

In one embodiment, when dragging a viewing frame, the JavaScript initiates the drag when the user clicks and drags the mouse beyond a pre-determined threshold, and illustrates the dragging by moving the viewing frame with the user's movement of the input device (e.g., mouse/pointer). To illustrate that a viewing frame is being dragged, one viewing frame image is left centered in the secondary map 155, while the user moves the other viewing frame. The moving frame could be, for example, the current or alternate position viewing frame, depending on whether synchronous or serial movement in enabled. When the user releases the mouse button, the viewing frame and/or maps move accordingly, as described herein. While the drag goes on, the JavaScript can be configured to continually update the data on the map, such as location markers and graphically depicted driving directions. The viewing frames can also be configured with a degree of opacity so as to give them more depth than a geometric shape. In such a case, the view of the secondary map underneath the viewing square can be made, for instance, slightly darker than the view of the secondary map that is not underneath the viewing square.

FIG. 2c illustrates a secondary map and main map of a digital mapping systems, in accordance with another embodiment of the present invention. In this example embodiment, the secondary map 155 extends along the entire bottom of the main map 135. Main and secondary map details previously discussed with reference to FIGS. 1a-b and 2a-b are equally applicable here. In addition, note how the secondary map includes zoom controls 255 (e.g., pull-down menu) and mode select controls 260 (e.g., radio buttons). Also, more of the browser window space is used to display the main and secondary maps, as the right most text section shown along the right side of the maps in FIGS. 1a-b is not employed. In any case, the user can set mode select 145 to one map type (e.g., traditional, satellite, or hybrid) for the main map 135, and mode select 255 to the same or different map type for the secondary map 155. Likewise, the user can set zoom controls 110 to one zoom level for the main map 135, and zoom controls 260 to the same or different zoom level (higher or lower) for the secondary map 155. Such a configuration provides the user with ample sized main and secondary maps that can be set to distinct map types and zoom levels to give the user a significant degree of flexibility and usefulness.

Other modifications and features will be apparent in light of this disclosure. For example, the secondary map 155 can be shown on a first monitor, while the main map 135 is shown on a second monitor. In this sense, the secondary map 155 need not be located on or even near the main map 135. Also, the shape and position of the secondary map 155 can vary. For instance, in another particular case, the secondary map 155 can extend along the entire right, left, or top side of the main map 135 (as opposed to being in one corner or across the bottom of the main map). In another particular embodiment, the shape and location of the secondary map 155 is configurable by the user, where the user can drag the edges of the default secondary map to set the size and location of that secondary map as desired. The user can then save that secondary map size/shape setting to be the new default setting, so that it will be used any time the user enables the secondary map (until the setting is changed again). Thus, a resizable secondary map can be employed to suit user preference for size and/or location.

Digital Mapping System

Figure 3:
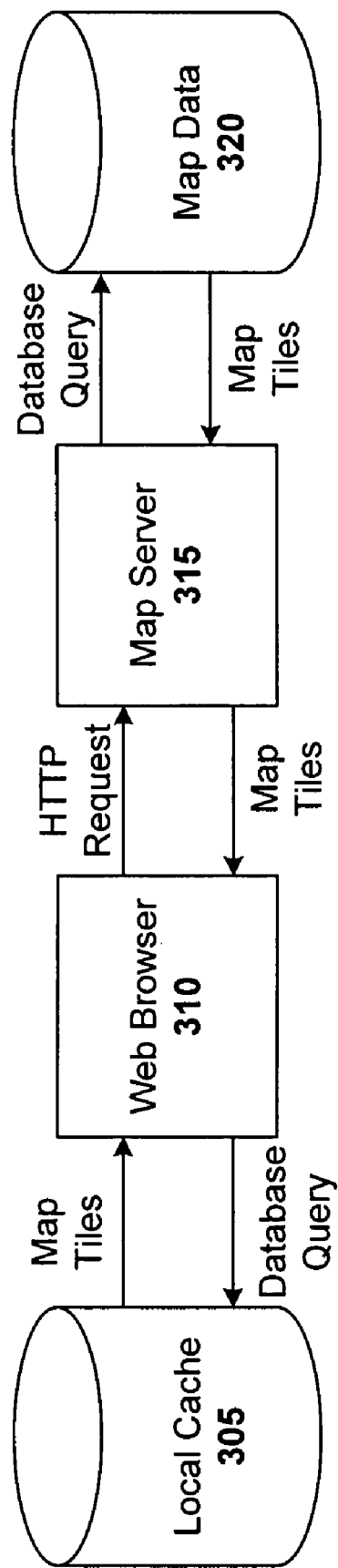
FIG. 3 is a block diagram of a digital mapping system that provides a secondary map and interface, in accordance with one embodiment of the present invention.

FIG. 3 is a block diagram of a digital mapping system that provides a secondary map and interface, in accordance with one embodiment of the present invention. As can be seen, the system includes a local cache 305, a web browser 310, a map server 315, and a map data database 320. This embodiment is based on the digital mapping systems described in the previously incorporated U.S. application Ser. Nos. 11/051,534 and 11/088,542. However, other mapping systems such as vector-based and raster-based mapping systems can also benefit from secondary map functionality as described herein.

In reference to FIG. 3, when a user requests a map or a new map view, the web browser 310 sends HTTP requests to map server 315 for map tiles needed in conjunction with the tiles already present in the web browser 310 (or in the web browser's cache) to produce the new map view. The format of the tile requests can be structured in a manner that encourages the web browser 310 to cache the tiles on its local cache 305. By executing scripts as previously described in U.S. application Ser. Nos. 11/051,534 and 11/088,542, the web browser 310 then assembles the combined set of tiles into the requested map view for presentation to the user.

In addition to the scripts that assemble the map tiles to form the requested map view, the web browser 310 also executes scripts and function calls to enable and carryout the secondary map functionality, as described herein. Each of the synchronized, partially synchronized, and serial modes can be implemented, for example, using JavaScript code and function calls as described herein (e.g., FIGS. 4 and 5a-5b and detailed description thereof). Other browser-side programming tools can be used as well to carry out the secondary map functionality.

Methodology

Figure 4:
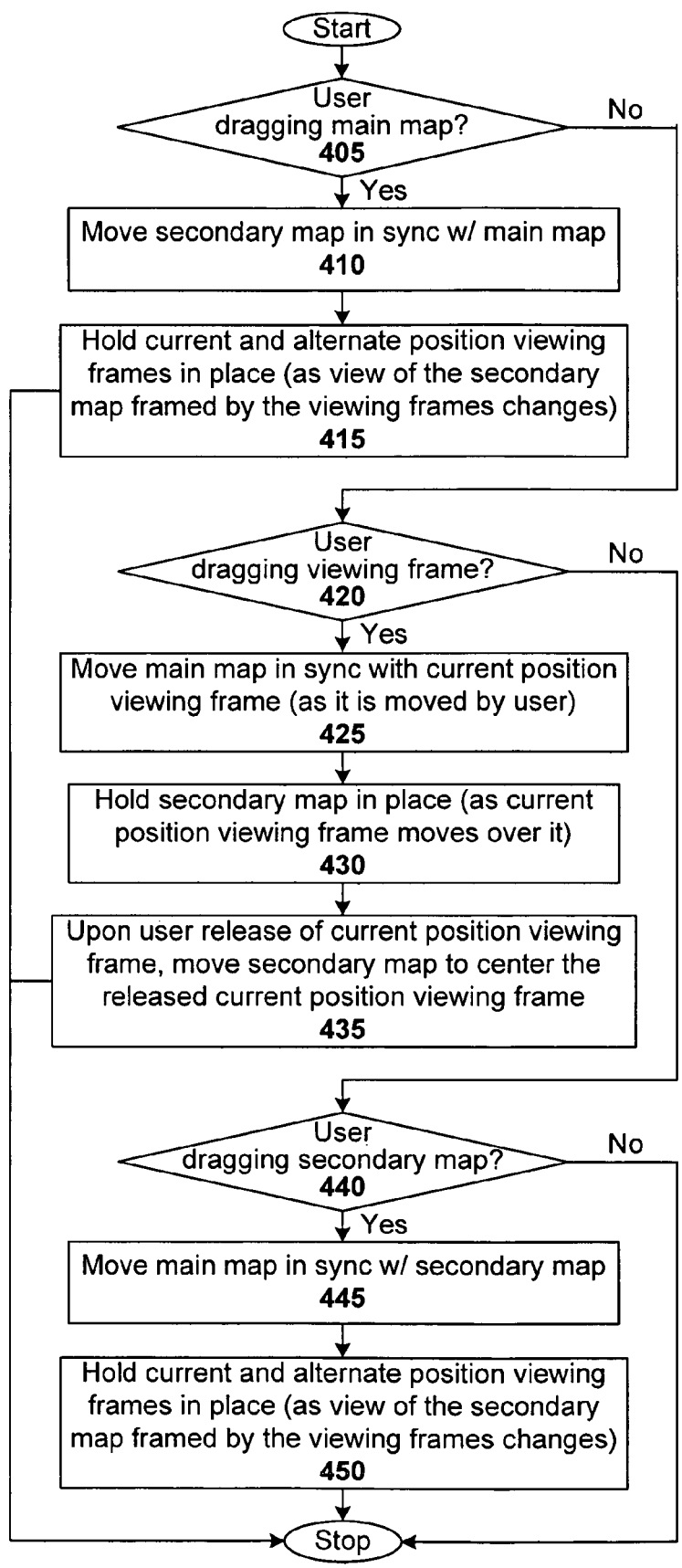
FIG. 4 illustrates a method for moving a secondary map and a main map, in response to user input, operating in a synchronous relationship, in accordance with one embodiment of the present invention.

FIG. 4 illustrates a method for moving a secondary map and a main map, in response to user input, operating in a synchronous relationship, in accordance with one embodiment of the present invention. The method can be carried out, for example, in a digital mapping system that includes a client-side that requests map data from a server-side (e.g., such as the one shown in FIG. 3). In one particular such case, the method is carried out on the client-side. The server functionality (or a sub-set of that functionality) can also be integrated into the client-side, so as to eliminate (or otherwise reduce) the need to communicate with a remote server. The method can be, for instance, encoded as a set of instructions on one or more processor readable mediums (e.g., server, hard disk, or other memory), and carried out by a computer or other processing environment capable of executing those instructions.

The method begins with determining 405 if the user is moving the main map (e.g., by dragging or panning). If so, the method continues with moving 410 the secondary map in sync with main map. The method continues with holding 415 current and/or alternate position viewing frames in place, as the view of the secondary map framed by the viewing frame(s) changes. Recall that the current and alternate position viewing frames are shown as a single frame, and are used, for instance, when the secondary map area is larger than the main map area. Alternative embodiments can use a single viewing frame that moves based on user input (e.g., direct movement of viewing frame caused by the user dragging that viewing frame, or indirect movement of a viewing frame caused by the user dragging the main or secondary maps). With embodiments including two viewing frames, the moved viewing frame and the viewing frame that remains in place are eventually co-located or otherwise joined back into one viewing frame, and the secondary map is moved to centrally locate the viewing frame(s). With embodiments including one viewing frame, the moved frame is eventually centrally located on the secondary map, by movement of the secondary map.

If the user is not moving the main map, the method includes determining 420 if the user is moving the current position viewing frame (e.g., by dragging). If so, the method continues with moving 425 the main map in sync with the current viewing frame (as it is moved by user), and holding 430 the secondary map in place (as the current position viewing frame moves over it). Upon user release of the current position viewing frame, the method continues with moving 435 the secondary map to center the released current position viewing frame. In one embodiment, the alternate position viewing frame remains in place at the center of the secondary map as the current position viewing frame is moved. Note, however, that the alternate position viewing frame is not required (i.e., in other embodiments, only the current position viewing frame is drawn).

If the user is not moving the current position view frame, the method includes determining 440 if the user is moving the secondary map (e.g., by dragging or panning). If so, the method continues with moving 445 the main map in sync with secondary map, and holding 450 the current and alternate position viewing frames (if used), as the view of the secondary map framed by the viewing frame(s) changes. Note that the last determination (step 440) can be assumed to be true if the determinations of steps 405 and 420 are false. Further note that the order of the determinations can vary.

Figure 5A:
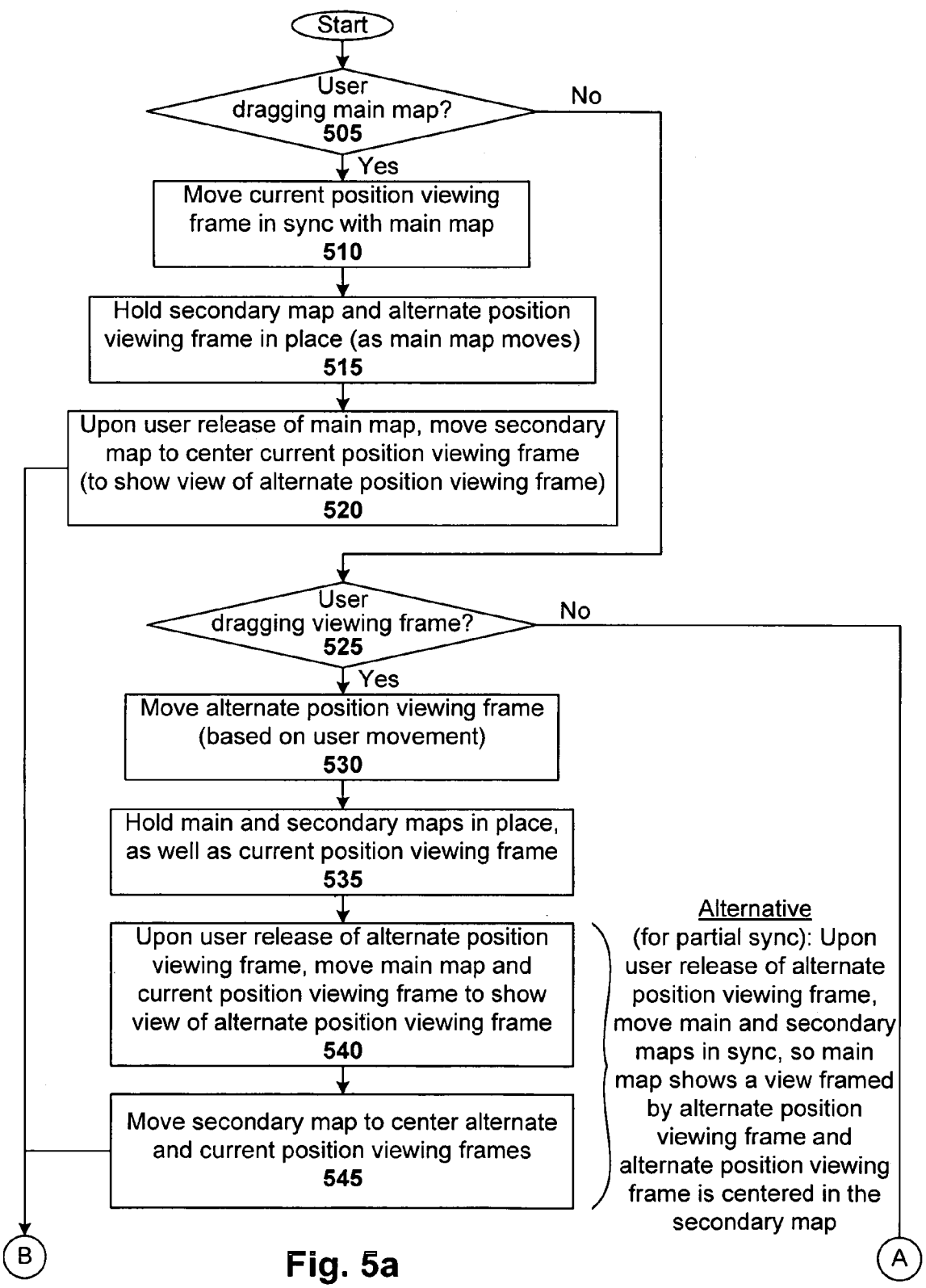
FIGS. 5a and 5b illustrate a method for moving a secondary map and a main map, in response to user input, operating in a serial or partially synchronous relationship, in accordance with one embodiment of the present invention.
Figure 5B:
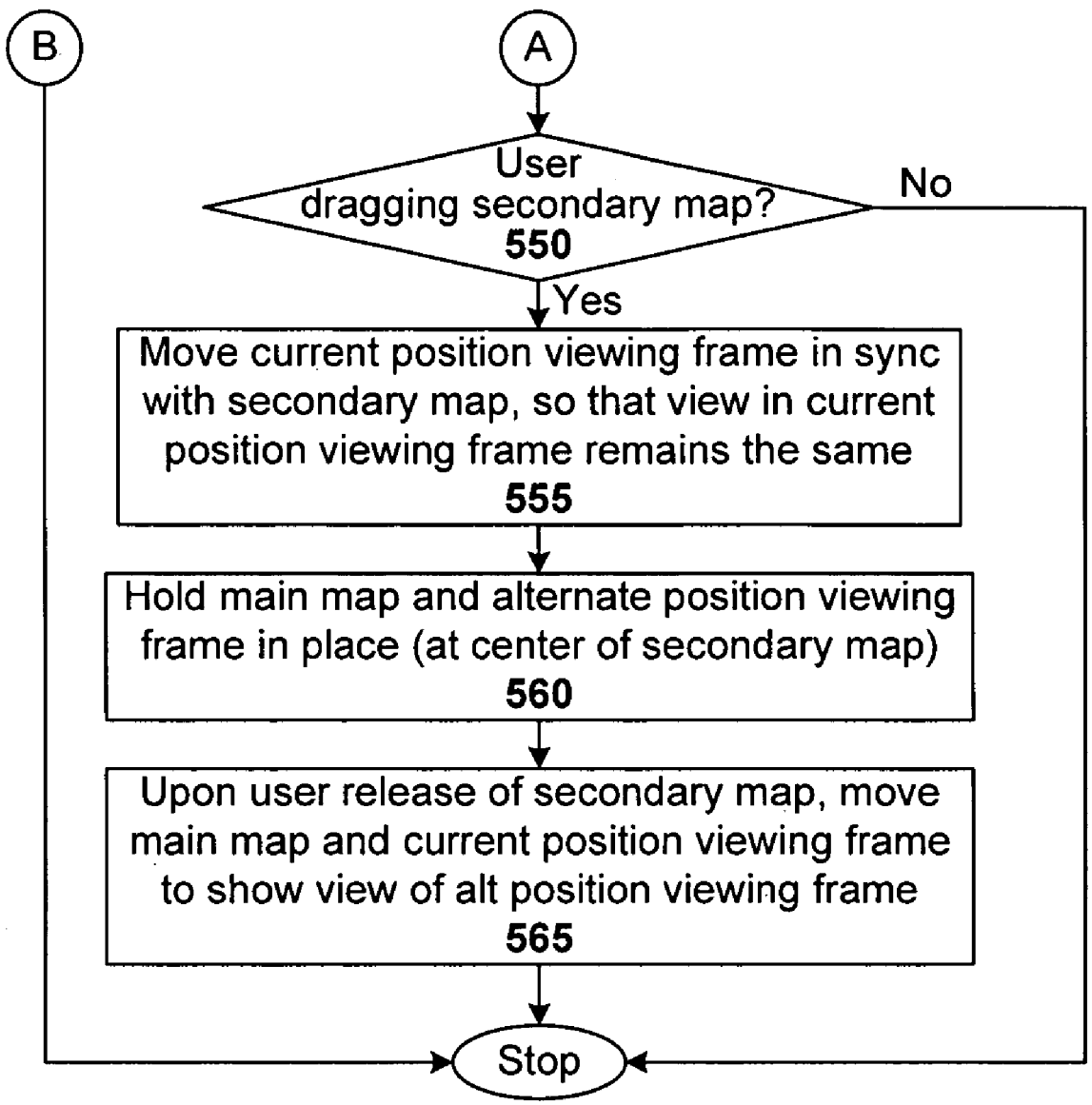

FIGS. 5a and 5b illustrate a method for moving a secondary map and a main map, in response to user input, operating in a serial or partially synchronous relationship, in accordance with one embodiment of the present invention. Just as with the method of FIG. 4, this method can be carried out, for example, on the client-side of a digital mapping system (with a local and/or remote map server system), and can be encoded as a set of instructions on a processor readable medium, and carried out by a processing environment (e.g., browser enabled computer) capable of executing those instructions.

The method begins with determining 505 if the user is moving the main map (e.g., dragging or panning). If so, the method includes moving 510 the current position viewing frame in sync with the main map, and holding 515 the secondary map and alternate position viewing frame in place (at center of secondary map). Upon user release of the main map, the method continues with moving 520 the secondary map to center the current position viewing frame (so as to show the view of the alternate position viewing frame). Also, the current and alternate position viewing frames are shown as a single frame, and can be used, for instance, if the secondary map area is larger than the main map area. Alternative embodiments only use one viewing frame.

If the user is not dragging or otherwise moving the main map, then the method continues with determining 525 if the user is moving the alternate position viewing frame (e.g., dragging). If so, the method includes moving 530 the alternate position viewing frame (based on user movement), and holding 535 the main and secondary maps in place, as well as current position viewing frame (at center of secondary map). Upon user release of the alternate position viewing frame, the method continues with moving 540 the main map and current position viewing frame to show the view of alternate position viewing frame, and moving 545 the secondary map to center the alternate and current viewing frame.

In an alternative embodiment, where the relationship between the main map and secondary map movement is partially synchronized (as opposed to serial), the functionality of steps 540 and 545 can be implemented as a single step. In particular, upon user release of the alternate position viewing frame, the method includes moving the main and secondary maps in sync, so the main map shows a view framed by the alternate position viewing frame and alternate position viewing frame is centered in the secondary map.

If the user is not moving the alternate position viewing frame, then the method continues with determining 550 if the user is moving the secondary map (e.g., dragging or panning). If so, the method includes moving 555 the current position viewing frame in sync with the secondary map (so that view in the current position viewing frame remains the same), and holding 560 the main map and alternate position viewing frame in place (at center of secondary map). Upon user release of the secondary map, the method continues with moving 565 the main map and current position viewing frame to show the view of the alternate position viewing frame. Note that the last determination (step 550) can be assumed to be true if the determinations of steps 505 and 535 are false. Further note that the order of the determinations can vary.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A digital mapping system, comprising:
a main map for displaying a first map view; and
a secondary map for displaying a second map view, wherein upon being enabled, the secondary map is displayed within space previously occupied by the main map;
wherein zoom level of the secondary map can be adjusted independently of main map zoom level.

2. The system of claim 1 wherein upon the secondary map being disabled, the main map is displayed within its original space and the secondary map is removed from display.

3. The system of claim 1 wherein the secondary map is resizable.

4. The system of claim 1 wherein a relative zoom level difference between the main map and the secondary map is maintained when allowed by zoom level limits, as zoom level of the main map is adjusted.

5. The system of claim 4 wherein if the relative zoom level difference cannot be maintained due to a zoom level limit associated with the secondary map, the relative zoom level difference is automatically reinstated when the secondary map zoom level limit is no longer a limit due to main map zoom level changes.

6. The system of claim 1 further comprising:
a viewing frame on one of the main map or the secondary map, wherein the map that has the viewing frame shows a geographic area that is larger than geographic area shown by the other map.

7. The system of claim 6 wherein the viewing frame, secondary map, and main map move in a synchronous relationship, in response to user input.

8. The system of claim 6 wherein the viewing frame, secondary map, and main map move in a serial relationship, in response to user input.

9. The system of claim 6 wherein the viewing frame, secondary map, and main map move in a partially synchronous relationship, in response to user input.

10. The system of claim 1 wherein each of the main map and the secondary map can be independently set to one of a traditional type, satellite type, or hybrid type map.

11. A computer-readable medium encoded with instructions, that when executed by a processor, cause the processor to carry out a digital mapping process, the process comprising:
displaying a main map;
displaying a secondary map, wherein upon being enabled, the secondary map is displayed within space previously occupied by the main map; and
adjusting zoom level of the secondary map independently of main map zoom level.

12. The computer-readable medium of claim 11, wherein upon the secondary map being disabled, the process further comprising removing the secondary map from display and displaying the main map over space previously occupied by the secondary map.

13. The computer-readable medium of claim 11, the process further comprising resizing the secondary map in response to user input.

14. The computer-readable medium of claim 11, the process further comprising maintaining a relative zoom level difference between the main map and the secondary map when allowed by zoom level limits, as zoom level of the main map is adjusted.

15. The computer-readable medium of claim 14 wherein if the relative zoom level difference cannot be maintained due to a zoom level limit associated with the secondary map, the process further comprises automatically reinstating the relative zoom level difference when the secondary map zoom level limit is no longer a limit due to main map zoom level changes.

16. The computer-readable medium of claim 11, the process further comprising:
displaying a viewing frame on one of the main map or the secondary map, wherein the map that has the viewing frame shows a geographic area that is larger than geographic area shown by the other map.

17. The computer-readable medium of claim 11 wherein the process enables each of the main map and the secondary map to be independently set to one of a traditional type, satellite type, or hybrid type map.

18. A computer-readable medium encoded with instructions, that when executed by a processor, cause the processor to carry out a digital mapping process, the process comprising:
displaying a main map;
displaying a secondary map, wherein upon being enabled, the secondary map is displayed within space previously occupied by the main map; and
resizing the secondary map in response to user input.

19. The computer-readable medium of claim 11, wherein upon the secondary map being disabled, the process further comprises removing the secondary map from display and displaying the main map over space previously occupied by the secondary map.

20. The computer-readable medium of claim 14 wherein if a relative zoom level difference between the main map and secondary map cannot be maintained due to a zoom level limit associated with the secondary map, the process further comprises automatically reinstating the relative zoom level difference when the secondary map zoom level limit is no longer a limit due to main map zoom level changes.

21. The computer-readable medium of claim 11 wherein the process enables each of the main map and the secondary map to be independently set to one of a traditional type, satellite type, or hybrid type map.

22. A computer-readable medium encoded with instructions, that when executed by a processor, cause the processor to carry out a process for moving a secondary map and a main map of a digital mapping system, the process comprising:
in response to a user moving a main map, moving a secondary map associated with the main map;
in response to the user moving a viewing frame on the secondary map, moving the main map based on movement of the viewing frame; and
in response to the user moving the secondary map, moving the main map based on movement of the secondary map;
wherein zoom level of the secondary map can be adjusted independently of main map zoom level.

23. The computer-readable medium of claim 22 wherein the digital mapping system includes a client-side that requests map data from a server-side, and the process is carried out on the client-side.

24. The computer-readable medium of claim 22 wherein at least two of the viewing frame, secondary map, and main map move in a synchronous relationship, in response to user input.

25. The computer-readable medium of claim 22 wherein at least two of the viewing frame, secondary map, and main map move in a serial relationship, in response to user input.

26. The computer-readable medium of claim 22 wherein zooming of the secondary map can optionally be synchronized with zooming of the main map.

27. The computer-readable medium of claim 22 wherein parameters of the secondary map are configurable by a user.

28. The computer-readable medium of claim 27 wherein the parameters of the secondary map include at least one of zoom level, synchronization with main map movement.

29. The computer-readable medium of claim 27 wherein the parameters of the secondary map include map type, which allows the user to configure the secondary map to include satellite images.

30. The computer-readable medium of claim 22 wherein the secondary map is resizable.

31. The computer-readable medium of claim 22 wherein a relative zoom level difference between the main map and the secondary map is maintained when allowed by zoom level limits, as zoom level of the main map is adjusted.

32. The computer-readable medium of claim 22 wherein in response to the user moving the main map, the process further includes holding the viewing frame in place as a view of the secondary map framed by the viewing frame changes.

33. The computer-readable medium of claim 22 wherein in response to the user moving the viewing frame, the process further includes holding the secondary map in place as the viewing frame moves over it.

34. The computer-readable medium of claim 33 wherein upon user release of the viewing frame, the process further includes moving the secondary map to center the released viewing frame.

35. The computer-readable medium of claim 22 wherein in response to the user moving the secondary map, the process further includes holding the viewing frame in place as a view of the secondary map framed by the viewing frame changes.

36. The computer-readable medium of claim 22 wherein in response to the user moving the main map, the process further includes:

holding the secondary map and an alternate position viewing frame in place as the main map and the viewing frame move; and upon user release of the main map, moving the secondary map to center the viewing frame.

37. The computer-readable medium of claim 22 wherein in response to the user moving an alternate position viewing frame, the process further includes holding the main map, the secondary map, and the viewing frame in place.

38. The computer-readable medium of claim 37 wherein upon user release of the alternate position viewing frame, the process further includes:

moving the main map to show a view framed by the alternate position viewing frame;

moving the viewing frame to show the view framed by the alternate position viewing frame; and moving the secondary map to center the alternate position viewing frame and the viewing frame.

39. The computer-readable medium of claim 37 wherein upon user release of the alternate position viewing frame, the process further includes moving the main and secondary maps in sync, so the main map shows a view framed by the alternate position viewing frame and the alternate position viewing frame is centered in the secondary map.

40. The computer-readable medium 22 wherein in response to the user moving the secondary map, the process further includes:

holding the main map and an alternate position viewing frame in place; and upon user release of the secondary map, moving the main map and the viewing frame to show a view framed by the alternate position viewing frame.

\* \* \* \* \*